Patented Apr. 27, 1948

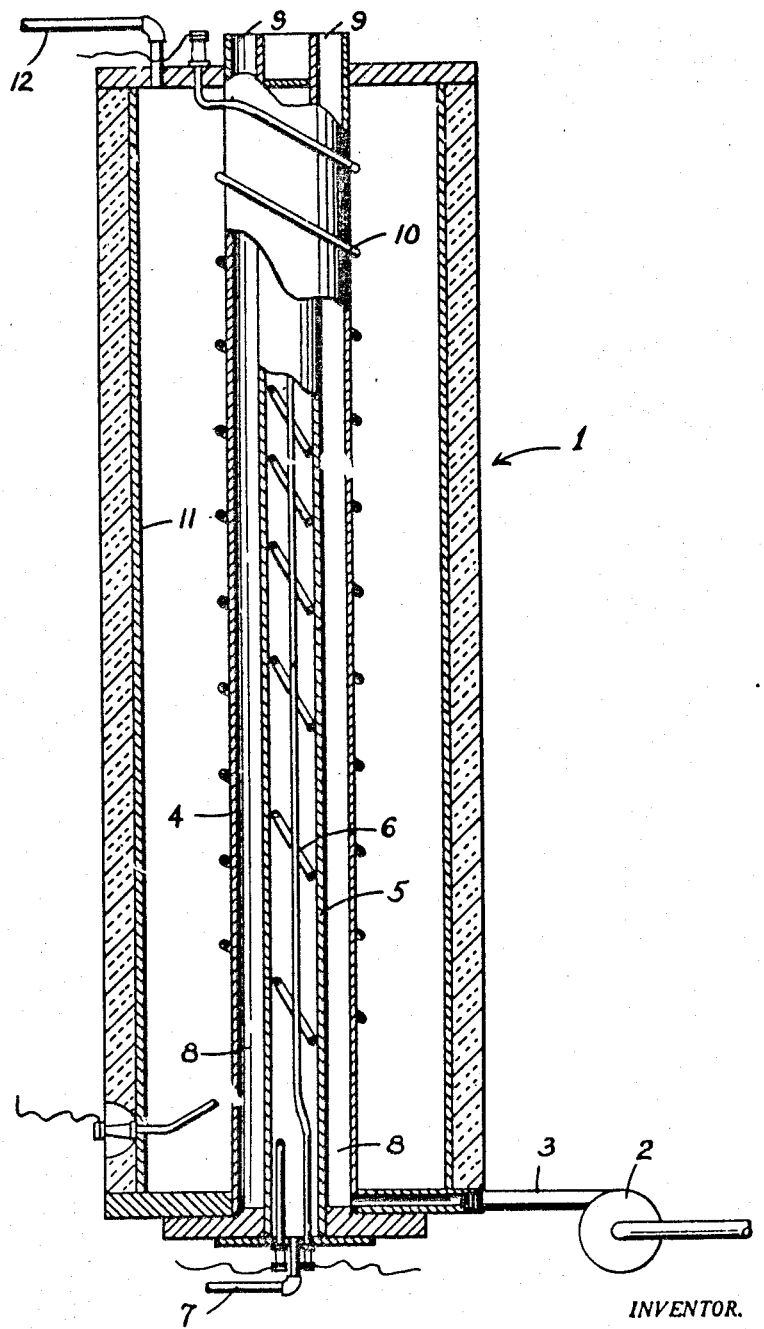

2,440,323

UNITED STATES PATENT OFFICE 2,440,323

EXTRUSION MOLDING OF VISCOSE PRODUCTS

Orlando A. Battista, Claymont, Del., assignor to American Viscose Corporation, Wilmington, Del., a corporation of Delaware Application December 18, 1943, Serial No. 514,740

2 Claims. (Cl. 18—55)

This invention relates to the production of molded articles from viscose by the utilization of heat as the primary coagulating agent. More particularly, this invention relates to the production of molded articles from viscose by a method involving extrusion through a heated press in which coagulation is effected.

In the production of cellulosic products from viscose, such as rayon, Cellophane, sausage casings, etc., the cellulose is usually regenerated by extruding the viscose into an acid coagulating and regenerating bath. Such acid regenerating baths are not practical for use in connection with the production from viscose of molded articles of large cross-section. In such cases, where acid-regenerating processes are employed, gas pockets and other irregularities are formed within the mass as a result of the rapid formation of a less permeable skin on the articles which hinders the diffusion of acid into the body of the articles, and the removal by diffusion of the gas-forming by-products subsequently formed within the body of the articles by the action of the acid.

Heretofore, it has not been considered commercially feasible to fabricate molded articles from viscose by the use of heat alone as the coagulating agent because of the relatively prolonged period of time required for coagulation of viscose under such conditions, and the great outlay of equipment incident thereto. No practical method has been available whereby the time required for viscose to coagulate under such conditions could be decreased to such an extent as to render the molding of viscose, and especially the molding thereof by continuous extrusion methods, commercially attractive.

It is known that heating alone will accelerate the coagulation of viscose, but in order to increase the rate of coagulation by the use of heat alone to such an extent as to permit the molding of shaped articles from viscose in a manner which will meet present-day commercial mass-production requirements, it would be necessary to use comparatively high temperatures, that is temperatures well over 100° C. Such temperatures cannot be used successfully in connection with the molding of viscose unless extremely high pressures are used to prevent the formation of bubbles in the articles. When viscose is forced through an extrusion press heated to a temperature of much above 100° C., e. g., at temperatures of 120° C. or so, the water contained in the viscose vaporizes, with the result that the solid gel initially set up in the press by the heat is quickly broken as the pressure is released upon emergence from the press and the material is extruded in the form of discontinuous, discrete particles, instead of in the desired continuous solid gel state. While lower temperatures, such as temperatures of less than 100° C., can be used in the continuous extrusion molding process, the rate of coagulation of viscose at such temperatures is too slow for commercial operation. In most cases in which such temperatures alone are relied upon to effect coagulation, a considerable period of time is required before the viscose is substantially completely coagulated, even when the viscose has a salt figure near the zero point as determined by the standard salt (NaCl) test or the Hottenroth ($NH_4Cl$) test whereas, if the molding of viscose to shaped articles is to be regarded as commercially practicable by the molding industry, it is vital that coagulation of the viscose in the mold should be substantially completely effected in a matter of one hour or less, regardless of the age of the viscose, so as to ensure a rapid turnout of molded articles on a large scale with a minimum outlay of equipment.

It is, therefore, an object of the present invention to provide a method of markedly accelerating the rate at which viscose is coagulated or gelled by heat.

It is a further object of the invention to provide a simple, practical, and economical method for converting viscose into durable molded articles in a short space of time and without the necessity of resorting to temperatures in excess of 100° C.

Other objects and advantages will appear herewith.

In accordance with one embodiment of this invention, a gelation accelerator is added to viscose of any age, and prior to molding the same, a sufficient amount of the accelerator being incorporated to be capable of effecting gelation of the viscose in a period of time not over one hour at a temperature of 80 to 100° C., after which the viscose is molded or extruded, and coagulated by heating. There are many such viscose gelation accelerators which will effect the desired acceleration of the rate at which viscose is coagulated to a substantially solid rigid state by heat, in accordance with my invention.

Among such substances may be mentioned compounds of di- and tetra-valent tin, aceto-acetic ester, aluminum compounds, antimony compounds, arsenic compounds, and zinc sulfate. The viscose gelation accelerator may be added to the viscose in a wide range of proportions. The proportion to be used in each case will depend upon the particular accelerator employed, and may vary from less than 0.1% up to 10% or more. Tin compounds, of which sodium stannate and stannic chloride are representative, are particularly effective viscose gelation accelerators even at room temperature. The tin compounds exert such a powerful accelerating effect on the rate at which viscose is coagulated to a substantially solid, rigid state by heat that even when they are added to the viscose in an amount as low as about 1%, and the mixture is heated to about 100° C., the viscose is substantially completely coagulated in two and one-half minutes or less. The tin compounds may be used in other amounts of desired, larger amounts reducing the gelation time for any given temperature and smaller amounts increasing such gelation time.

Mixtures of viscose and the gelation accelerators of my invention have been found to be peculiarly well-adapted to rapid and efficient molding into shaped articles by standard molding techniques, and especially by the continuous extrusion method. According to the invention, a viscose gelation accelerator is added, and preferably uniformly mixed into the viscose, prior to the introduction thereof into the extrusion apparatus, or into stationary batch molds of any desired shape, and the viscose is coagulated by subjecting it to heat in the mold or extrusion press. Because of the greatly accelerated speed with which coagulation of viscose by heat is effected in the presence of the viscose gelation accelerator, it is unnecessary to resort to undesirably high temperatures, and temperatures of 80° C. to 100° C. which are entirely suitable for use in connection with continuous extrusion devices, may be employed.

By rapidly and continuously forcing the mixture of viscose and viscose gelation accelerator according to my invention through an extrusion press which is heated to a temperature of about 100° C. or lower, rods, tubes, mono-filaments of relatively large cross-section, such as mono-fils of 100 to 100,000 deniers, and similar shaped products may be obtained.

The mixture of viscose and the viscose gelation accelerator may also be molded to any other desired three-dimensional shapes by simply pouring the mixture into molds of the desired shape, and subjecting the same to heat to coagulate the viscose. Thus, articles of any special shape, such as receptacles for liquids, foods, cosmetics, pharmaceuticals, special shipping containers; novelties, particularly dress ornaments, such as costume jewelry, bracelets, buttons, and so forth, may be rapidly, efficiently, and economically obtained. The mixtures may also be cast or extruded to form films, sheets, or the like.

Because the viscose is coagulated by the use of heat only, and acid-regenerating baths are not employed, the molded products do not have to be subjected to any special after-treating processes, such as desulphurizing treatments or the like, and the articles comprising heat-coagulated viscose need only be subjected to washing with water to leach out any impurities obtained during decomposition due to the coagulation, after which they are ready for use. In the case of the extruded products, such as tubes, rods, etc., the shaped articles may be continuously passed from the extrusion device through the washing step and then directed to suitable cutting mechanisms, where they may be cut to any desired lengths, after which the lengths may be dried, with or without the application of pressure to assist in controlling the shape thereof. In those cases where the viscose is heat-coagulated in molds of any desired shapes, the products may be readily removed from the molds, and washed with water and dried. They may be suitably decorated, if desired.

Any viscose of any salt point as determined by the standard common salt (NaCl) test or the Hotteneroth test (NH₄Cl) may be used according to my invention, although it may be preferred, to use a viscose which has been ripened by the usual methods nearly to the coagulation point. The viscose may, if desired, be modified by the incorporation therein of special agents, such as dulling agents, fillers, pigments, delustrants, dyes, and so on.

The viscose gelation accelerator according to my invention may be added to the viscose at different times prior to molding the viscose, the point at which the accelerator is to be added being dependent upon the particular accelerator and concentration thereof employed. In most cases, the viscose gelation accelerators, even when used in the lower concentrations, exert such a remarkable quickening action on the rate at which gelation of the viscose proceeds to a substantially solid state regardless of the age of the viscose, and in the case of the tin compounds, more particularly, even at room temperature, that it is advisable to add the accelerator to the viscose immediately prior to introducing the mixture to the mold or extrusion press.

The following example is given to illustrate one aspect of the invention.

*Example*

A viscose which had been aged to a common salt (NaCl) figure of 5.0, and to which had been added 0.5% by weight of sodium stannate, was forced through an extrusion press heated to 100° C., and adapted to set the extruded coagulated viscose in the form of a tube having about 1⅛" thickness. The viscose was substantially completely coagulated and set up in the press in 2½ minutes. The extruded tube was continuously passed through a washing bath consisting of hot water, and then through a device for cutting it to desired lengths, after which the lengths were dried.

The invention will be more readily understood by reference to the accompanying drawing in which one type of device suitable for carrying out the molding step is illustrated. The drawing represents an elevation view in partial section of an extrusion device.

In the drawing the numeral 1 indicates generally an extruding device suitably connected with a conventional viscose pump 2 through delivery pipe 3. The device comprises a centrally disposed cylindrical chamber 4 enclosing a centrally disposed cylindrical core 5 and an annular extrusion channel or passageway 8 adapted to receive the mixture to be molded through delivery pipe 3, and terminating in an annular extrusion orifice 9. The core 5 is provided with a centrally disposed heating element comprising a heating coil 6 having suitable electrical connections (not shown), and which may be surrounded by a liquid such as oil, which may be introduced to the core 5 through inlet 7. The exterior surface of cylindrical chamber 4 carries a heating coil 10 having suitable electrical connections (not shown). A chamber 11 surrounds cylindrical chamber 4 and may be filled with a liquid such as oil through inlet 12. The outside of the device may be coated with a heat-insulating material.

When the mixture of viscose and the viscose gelation accelerator is pumped through delivery pipe 3 into annular extrusion channel 8, it encounters a moderately elevated temperature of from about 80° C. to 100° C. which is maintained throughout the length of the annular extrusion channel 8 by suitable adjustment and control of the heat supplied to heating coils 6 and 10. The viscose is coagulated by the heat and set up in the channel 8 from which it passes continuously through extrusion orifice 9 in the form of a solid or semisolid, substantially rigid tube, due to the pressure exerted by continuous operation of the pump 2.

As shown, the apparatus is designed for the extrusion of the coagulated viscose upwardly in a substantially vertical direction. Obviously, the apparatus may be arranged at any desired inclination to the vertical, such as horizontal, or it may be arranged to extrude the viscose downwardly. When extruding upwardly at relatively small inclinations to the horizontal or downwardly at any angle, the annular extrusion channel 8 is preferably modified so that it tapers down appreciably in cross-section toward the orifice 9, to insure the maintenance of pressure upon the mass being extruded, and to compensate for any shrinkage of the coagulated viscose that may occur in the channel.

While I have found it convenient to illustrate the invention by reference to a specific form of molding operation, it is to be understood that the invention is not limited to this particular type of process, since, in its broader aspects, it envisages the acceleration of heat-coagulation of viscose and molding thereof, whether the molding is carried out by the extrusion or stationary molding processes.

The molded products obtained by my process vary from a transparent to a translucent or even opaque appearance depending upon the thickness. They may be colorless, but if pigments have been introduced into the viscose, the color of the pigment is essentially controlling.

While preferred embodiments of the invention have been disclosed, the description is intended to be illustrative only, and it is to be understood that changes and variations may be made without departing from the spirit and scope of the invention as defined by the appended claims.

I claim:

1. In a process of producing shaped articles from viscose, the steps of adding a gelation accelerator to the viscose in an amount sufficient to effect coagulation thereof in a period of time of the order of one hour or less at a temperature of about 80° C. to 100° C. and then molding and coagulating the viscose by continuously forcing the mixture through an extrusion molding device externally heated to a temperature of about 80° C. to 100° C., such heat being the sole coagulating medium.

2. In a process of producing shaped articles from viscose, the steps of adding a gelation accelerator to the viscose in an amount up to about 10% thereof by weight to effect coagulation of the viscose in a period of time of the order of one hour or less at a temperature of about 80° C. to 100° C. and then molding and coagulating the viscose by continuously forcing the mixture through an extrusion molding device externally heated to a temperature of about 80° C. to 100° C., such heat being the sole coagulating medium.

ORLANDO A. BATTISTA.

REFERENCES CITED

The following references are of record in the file of this patent:

UNITED STATES PATENTS

| Number | Name | Date |
|---|---|---|
| 1,142,619 | Pum et al. | June 8, 1915 |
| 1,652,711 | Eggert | Dec. 13, 1927 |
| 2,026,177 | Johannes | Dec. 31, 1935 |
| 2,064,355 | Picard et al. | Dec. 15, 1936 |
| 2,077,412 | Herzog, et al. | Apr. 20, 1937 |
| 2,105,380 | Speijer | Jan. 11, 1938 |
| 2,117,392 | Banigan | May 17, 1938 |

FOREIGN PATENTS

| Number | Country | Date |
|---|---|---|
| 242,240 | Great Britain | Feb. 11, 1926 |
| 518,234 | Germany | Feb. 13, 1931 |